United States Patent
Lowe et al.

(10) Patent No.: US 9,475,255 B2
(45) Date of Patent: Oct. 25, 2016

(54) HEAT RESISTANT COATING FOR USE IN AIRBAGS AND METHODS OF THEIR MANUFACTURE

(71) Applicant: AIRBAG TECHNOLOGIES LLC, Roebuck, SC (US)

(72) Inventors: Vernon John Lowe, Greenback, TN (US); Steven F. Nielsen, Charlotte, NC (US)

(73) Assignee: Airbag Technologies LLC, Roebuck, SC (US)

( * ) Notice: Subject to any disclaimer, the term of this patent is extended or adjusted under 35 U.S.C. 154(b) by 0 days.

(21) Appl. No.: 14/423,906

(22) PCT Filed: Aug. 27, 2013

(86) PCT No.: PCT/US2013/056771
§ 371 (c)(1),
(2) Date: Feb. 25, 2015

(87) PCT Pub. No.: WO2014/035948
PCT Pub. Date: Mar. 6, 2014

(65) Prior Publication Data
US 2015/0266264 A1    Sep. 24, 2015

Related U.S. Application Data

(60) Provisional application No. 61/693,564, filed on Aug. 27, 2012.

(51) Int. Cl.
*B60R 21/235* (2006.01)
*B60R 21/264* (2006.01)
(Continued)

(52) U.S. Cl.
CPC ............... *B32B 5/022* (2013.01); *B32B 5/024* (2013.01); *B32B 5/26* (2013.01); *B32B 7/14* (2013.01);
(Continued)

(58) Field of Classification Search
CPC ............. B60R 21/235; B60R 21/264; B60R 2021/23514; B60R 2021/23123; B32B 5/022; B32B 5/024; B32B 5/26; B32B 7/14; B32B 27/12; B32B 27/36; B32B 2605/00; B32B 2605/08; B32B 2255/02; B32B 2255/10; B32B 2255/205; B32B 2255/26; B32B 2264/10; B32B 2307/306; B32B 2571/00; Y10T 442/30; Y10T 442/60; Y10T 428/259; Y10T 428/263
See application file for complete search history.

(56) References Cited

U.S. PATENT DOCUMENTS 3,870,841 A * 3/1975 Makowski ............. C08C 19/20
                                                524/130
4,495,238 A * 1/1985 Adiletta ............ A41D 31/0027
                                                428/215

(Continued)

*Primary Examiner* — Laura Freedman
(74) *Attorney, Agent, or Firm* — Dority & Manning, P.A.

(57) ABSTRACT

A heat shield is generally provided, along with methods of making the heat shield and its use in a vehicle safety device (e.g., an airbag). In one embodiment, the heat shield includes a base substrate (e.g., a nonwoven fabric, a woven fabric, or a film); a heat resistant coating on the base substrate; and a first point-bonded sheet laminated to the heat resistant coating such that the first point-bonded sheet forms an outer surface of the heat shield with the heat resistant coating positioned between the first point-bonded sheet and the base substrate. The heat resistant coating generally comprises particles of an inorganic mineral (e.g., vermiculite, mica, or a combination thereof) dispersed within a film-forming binder (e.g., an acrylic resin, a styrene-butadiene rubber, a polyvinyl alcohol, an ethyl vinyl acetate resin, a phenolic resin, or a combination thereof).

17 Claims, 3 Drawing Sheets

(51) Int. Cl.
*B32B 5/02* (2006.01)
*B32B 5/26* (2006.01)
*B32B 7/14* (2006.01)
*B32B 27/12* (2006.01)
*B32B 27/36* (2006.01)

(52) U.S. Cl.
CPC ............ *B32B 27/12* (2013.01); *B32B 27/36* (2013.01); *B60R 21/235* (2013.01); *B60R 21/264* (2013.01); *B32B 2255/02* (2013.01); *B32B 2255/10* (2013.01); *B32B 2255/205* (2013.01); *B32B 2255/26* (2013.01); *B32B 2264/10* (2013.01); *B32B 2307/306* (2013.01); *B32B 2571/00* (2013.01); *B32B 2605/00* (2013.01); *B32B 2605/08* (2013.01); *B60R 2021/23514* (2013.01); *Y10T 428/259* (2015.01); *Y10T 428/263* (2015.01); *Y10T 442/30* (2015.04); *Y10T 442/60* (2015.04)

(56) References Cited

U.S. PATENT DOCUMENTS

| | | | | |
|---|---|---|---|---|
| 4,726,987 A * | 2/1988 | Trask | ............... | B32B 5/06 156/276 |
| 4,944,527 A * | 7/1990 | Bishop | ............... | B60R 21/201 280/728.2 |
| 4,994,317 A * | 2/1991 | Dugan | ............... | A41D 31/0027 428/402 |
| 5,001,005 A * | 3/1991 | Blanpied | ............... | B29C 67/248 428/304.4 |
| 5,091,243 A * | 2/1992 | Tolbert | ............... | A47C 31/001 427/393.3 |
| 5,104,727 A * | 4/1992 | Wnenchak | ............... | B01D 39/1692 280/743.1 |
| RE34,020 E * | 8/1992 | Briggs | ............... | C04B 30/02 162/181.4 |
| 5,149,130 A * | 9/1992 | Wooley | ............... | B60R 21/2171 280/743.1 |
| 5,226,671 A * | 7/1993 | Hill | ............... | B60R 21/23 280/743.1 |
| 5,290,904 A * | 3/1994 | Colvin | ............... | B32B 27/06 126/400 |
| 5,447,330 A * | 9/1995 | Tagawa | ............... | B60R 21/23 280/739 |
| 5,520,415 A * | 5/1996 | Lewis | ............... | B60R 21/2171 280/732 |
| 5,578,368 A * | 11/1996 | Forsten | ............... | B32B 5/26 428/902 |
| 6,514,362 B1 * | 2/2003 | Zuckerman | ............... | D04H 11/00 156/237 |
| 7,419,593 B2 * | 9/2008 | Trauger | ............... | B09C 1/002 156/62.2 |
| 7,521,385 B2 * | 4/2009 | Ahluwalia | ............... | A47C 31/001 428/920 |
| 7,618,060 B2 * | 11/2009 | Harvey | ............... | B60R 21/2346 280/728.2 |
| 8,147,922 B2 * | 4/2012 | Skoog | ............... | B05B 5/043 427/470 |
| 2003/0224679 A1 * | 12/2003 | Ahluwalia | ............... | A47C 31/001 442/72 |
| 2003/0228460 A1 * | 12/2003 | Ahluwalia | ............... | A47C 31/001 428/315.5 |
| 2010/0330279 A1 * | 12/2010 | Fogden | ............... | C09D 5/028 427/256 |
| 2011/0079746 A1 * | 4/2011 | Fernando | ............... | E04B 1/80 252/62 |
| 2012/0070609 A1 * | 3/2012 | Poppe | ............... | B32B 5/16 428/95 |
| 2013/0189516 A1 * | 7/2013 | Sugino | ............... | B32B 27/18 428/339 |
| 2013/0210303 A1 * | 8/2013 | Doi | ............... | B32B 17/02 442/67 |
| 2015/0210240 A1 * | 7/2015 | Tanaka | ............... | B05D 7/00 442/189 |
| 2015/0321637 A1 * | 11/2015 | Lowe | ............... | B60R 21/2338 280/741 |

\* cited by examiner

HEAT RESISTANT COATING FOR USE IN AIRBAGS AND METHODS OF THEIR MANUFACTURE

PRIORITY INFORMATION

The present application claims priority to U.S. Provisional Patent Application Ser. No. 61/693,564 of Vernon John Lowe titled "Heat Resistant Coating for Use in Airbags and Methods of Their Manufacture" filed on Aug. 27, 2012, which is incorporated by reference herein.

BACKGROUND

An airbag is a vehicle safety device that generally includes a flexible envelope (e.g., a nylon fabric) designed to inflate rapidly during an automobile collision. The airbag's purpose is to cushion occupants during a crash and provide protection to their bodies when they strike interior objects such as the steering wheel or a window. Modern vehicles may contain multiple airbags in various side and/or frontal locations of the passenger seating positions, and sensors may deploy one or more airbags in an impact zone at variable rates based on the type and the severity of impact.

Most airbag designs are inflated by the ignition of a gas generator propellant via a pyrotechnic device to rapidly inflate the flexible envelope. The pyrotechnic device can generally include an electrical conductor wrapped in a combustible material and can activate quickly (e.g., less than 2 milliseconds) with a current pulse (e.g., of about 1 to about 3 amperes). When the conductor becomes hot enough, it ignites the combustible material (e.g., a solid propellant), which initiates the gas airbag (e.g., typical rate of inflation in current technology is about 20 to about 30 milliseconds). For example, the pyrotechnic device can include a propellant mixture of sodium azide ($NaN_3$), potassium nitrate ($KNO_3$), and silica dioxide ($SiO_2$), which can react in three separate reactions to produce nitrogen gas. The reactions, in order, are as follows:

$$2NaN_3 \rightarrow 2Na + 3N_2 \text{ (g)}; \quad (1)$$

$$10Na + 2KNO_3 \rightarrow K_2O + 5Na_2O + N2 \text{ (g)}; \quad (2)$$

$$K_2O + Na_2O + 2SiO_2 \rightarrow K_2O_3Si + Na_2O_3Si \text{ (silicate glass)}. \quad (3)$$

The first reaction is the decomposition of $NaN_3$ under high temperature conditions using an electric impulse. This impulse generates in excess of 300° C. temperatures required for the decomposition of the $NaN_3$ which produces Na metal and $N_2$ gas. Since Na metal is highly reactive, the $KNO_3$ and $SiO_2$ react and remove it, in turn producing more $N_2$ gas. The second reaction shows the additional generation of $N_2$ gas. The reason that $KNO_3$ is used, rather than something like $NaNO_3$, is because it is less hygroscopic. Absorbed moisture can de-sensitize the system and cause the reaction to fail; therefore, it is important that the materials used in this reaction are not hygroscopic. The final reaction eliminates the highly reactive metal oxides, $K_2O$ and $Na_2O$, produced in the second reaction. These metal oxides react with $SiO_2$ to produce a silicate glass, a harmless and stable compound. Other similar pyrotechnic device include combustible material as the propellant that produce gases and particles having extreme temperatures (e.g., about 500° C.).

As a result of these (or other, similar ignition reactions), the inner area of the airbag is exposed to hot gas as well as hot particulates formed during the ignition processes. These hot gases and hot particulates are particularly concentrated in the area within the airbag proximate to the pyrotechnic device. As a solution, attempts have been made to include a sacrificial fabric within the airbag in the area proximate to the pyrotechnic device to help protect the airbag fabric. In use, this sacrificial fabric is burnt by the hot gas and/or hot particulates. However, due to the need to ensure that the sacrificial layer can sufficiently protect the airbag fabric, multiple layers of the sacrificial layer is included (either unbonded or as a heat shield) within the device depending upon the combustion temperature expected at inflation. Thus, these sacrificial heat shield fabrics add significant thickness to the construction of the airbag device. Additionally, such sacrificial heat shield fabrics add significant cost to the airbag device.

As such, a need exists for an improved heat shield material to protect the airbag material from burning upon ignition of the pyrotechnic device.

SUMMARY OF THE INVENTION

Objects and advantages of the invention will be set forth in part in the following description, or may be obvious from the description, or may be learned through practice of the invention.

A heat shield is generally provided, along with methods of making the heat shield and its use in a vehicle safety device (e.g., an airbag). In one embodiment, the heat shield includes a base substrate (e.g., a nonwoven fabric, a woven fabric, or a film); a heat resistant coating on the base substrate; and a first point-bonded sheet laminated to the heat resistant coating such that the first point-bonded sheet forms an outer surface of the heat shield with the heat resistant coating positioned between the first point-bonded sheet and the base substrate. The heat resistant coating generally comprises particles of an inorganic mineral (e.g., vermiculite, mica, or a combination thereof) dispersed within a film-forming binder (e.g., an acrylic resin, a styrene-butadiene rubber, a polyvinyl alcohol, an ethyl vinyl acetate resin, a phenolic resin, or a combination thereof).

A second point-bonded sheet can be, in particular embodiments, laminated to the base substrate such that the second point-bonded sheet is positioned opposite to the first point-bonded sheet.

As stated, a vehicle safety device is also generally provided. In one embodiment, the vehicle safety device comprises an airbag comprising a base fabric and forming an interior space; a pyrotechnic device positioned within working proximity to an aperture defined in the airbag such that the pyrotechnic device is configured to fill the interior space of the airbag with a gas upon ignition; and the heat shield described above being positioned within the interior of the airbag and proximate to the aperture such that the first point-bonded sheet faces the interior space of the airbag.

A method of forming a heat shield is also generally provided, and can include wet-laying a coating composition onto a base substrate; drying the coating composition to remove the solvent and form a heat resistant coating on the base substrate; and laminating a first point-bonded sheet onto the heat resistant coating. In one embodiment, the coating composition comprises particles of an inorganic mineral, a film-forming binder, and a solvent.

Other features and aspects of the present invention are discussed in greater detail below.

BRIEF DESCRIPTION OF THE DRAWINGS

A full and enabling disclosure of the present invention, including the best mode thereof to one skilled in the art, is

Figure 1:
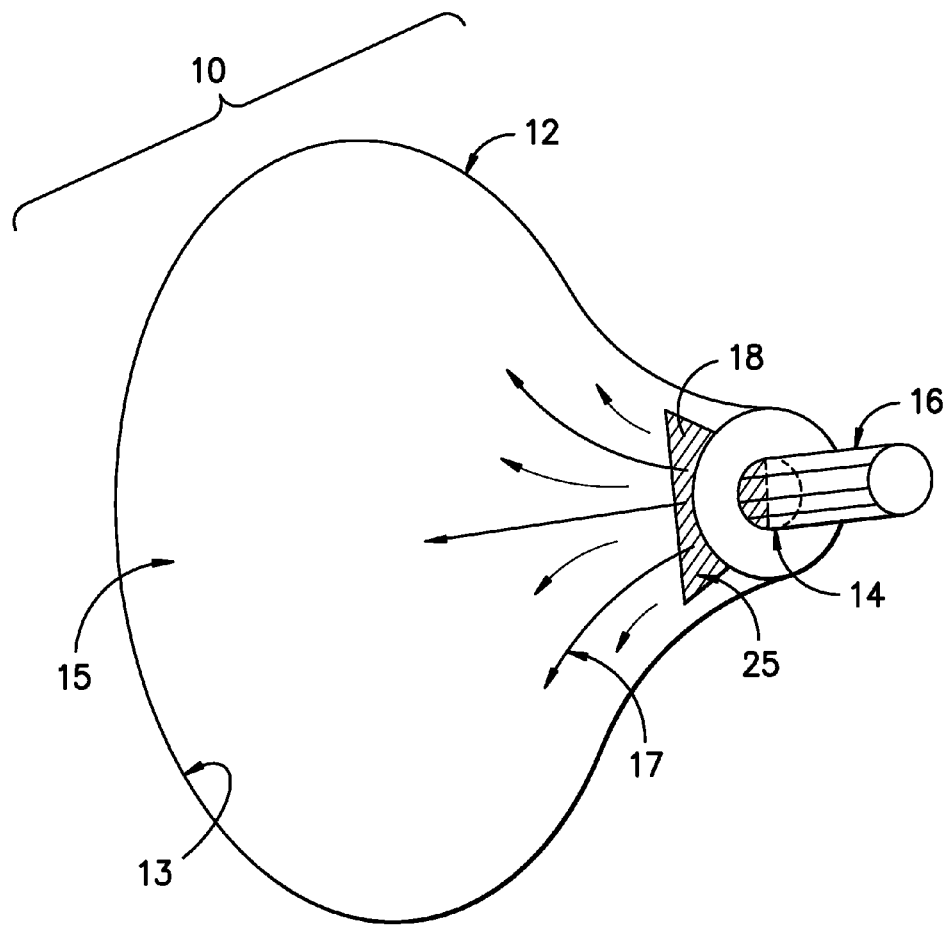
FIG. 1 shows one embodiment of the invention in which a heat shield comprising a heat resistant coating is used within an airbag.

Repeat use of reference characters in the present specification and drawings is intended to represent the same or analogous features or elements of the present invention.

DEFINITIONS

In the present disclosure, when a layer or coating is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of, up to about 5, up to 3, and up to about 4.5, as well as ranges within the limit, such as from about 1 to about 5, and from about 3.2 to about 6.5.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied in exemplary constructions.

Methods are generally provided for forming a heat shield, along with the resulting heat shields and their use (e.g., as a heat shield within a vehicle safety device, such as an airbag). Generally, the heat shield has a heat resistant coating on a base substrate. It has been found that the heat resistant coating provides protection to the underlying base substrate upon contact with a high temperature gas and/or particles released upon ignition of the pyrotechnic device, while still providing the flexibility required for an airbag to operate properly. In one embodiment, the temperature resistance performance of the heat shield can be controlled by incorporating multiple layers with the construction of the heat shield and/or combining multiple heat shield together.

Figure 3:
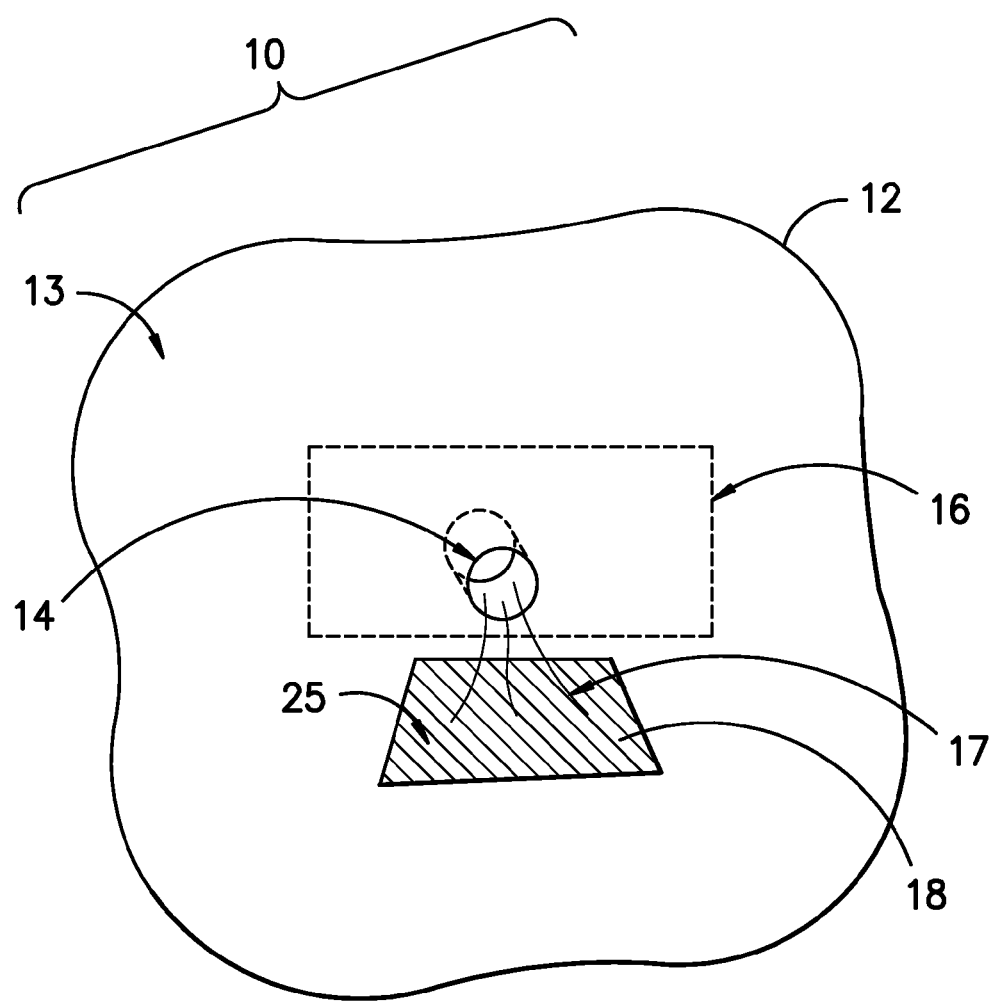
FIG. 3 shows a schematic of the embodiment of FIG. 1, with a closer view of the pyrotechnic device, the aperture, and the heat shield within the airbag.

The heat resistant coating can be utilized in various manners, depending on the particular structure of the airbag. For instance, FIGS. 1 and 3 show an exemplary airbag 12 having a heat shield 18 positioned within its interior 15 and proximate to the aperture 14 such that the exposed surface 25 of the heat shield 18 faces the interior 15 of the airbag. Each of these embodiments is discussed in greater detail below; however, the detail illustrated in these figures is meant to be used only for purposes of illustrating the features of the invention and not as an exact detail of the invention and is not intended to be drawn to scale.

No matter the particular configuration of the airbag, the heat resistant coating can be utilized to inhibit premature deflation of the airbag caused by particular and/or hot gas burn through.

I. Heat Shield

Figure 2:
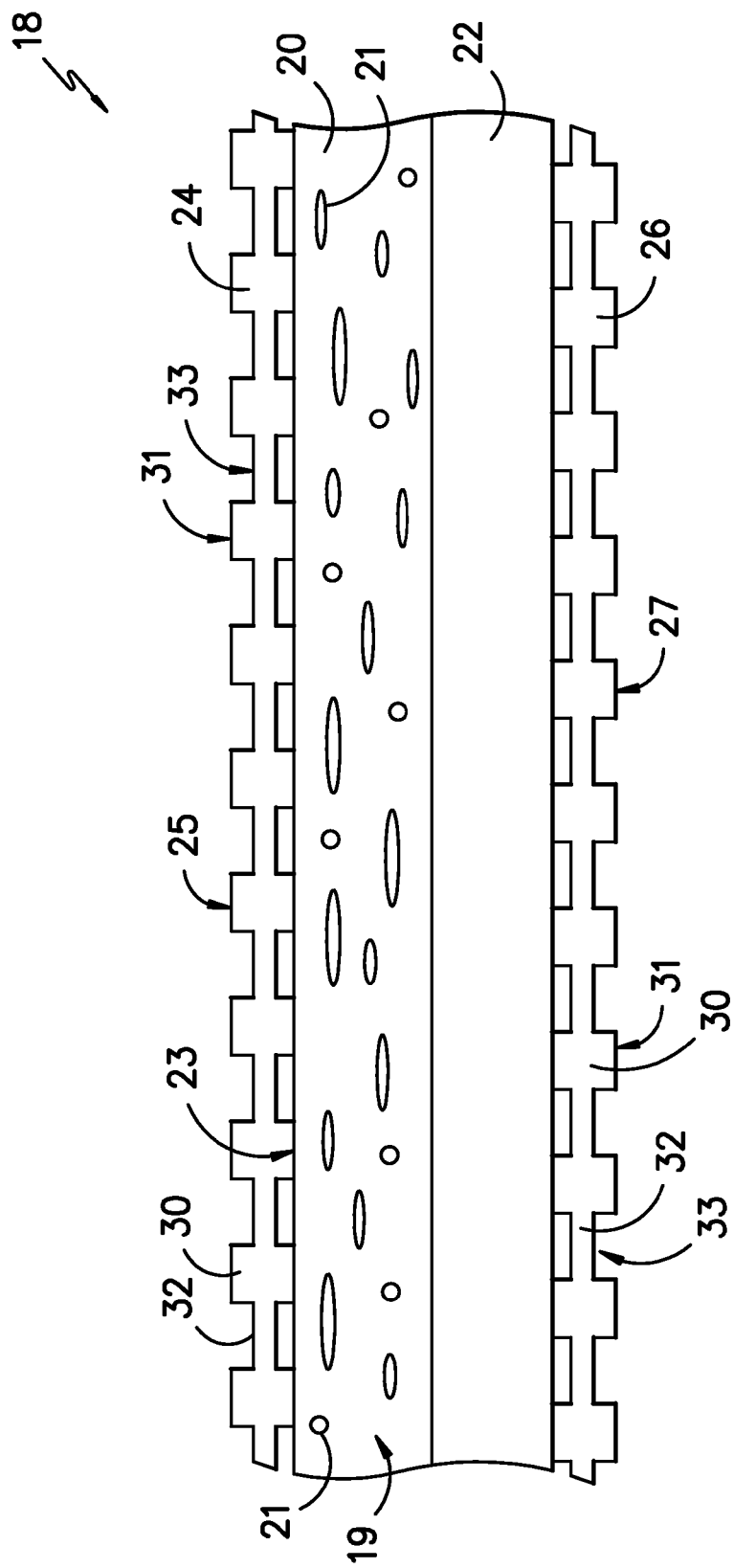
FIG. 2 shows a cross-sectional view of the heat shield including the heat resistant coating as in the embodiment of FIG. 1.

As stated, the heat resistant coating can be formed onto a base substrate to form a heat shield. FIG. 2 illustrates an exemplary heat shield 18, which can serve as the heat shield shown in FIGS. 1 and 3. The heat shield 18 generally includes the heat resistant coating 20 (described in greater detail below) bonded to a base substrate 22. Particles 21 of inorganic mineral are shown dispersed within the heat resistant coating 20. As shown, the heat resistant coating 20 is bonded directly to the base substrate 22 (i.e., without any intervening layer); however, other layers can be included within the heat shield 18 in alternative embodiments. FIG. 2 also shows that optional point-bonded sheets 24, 26 form the opposite surfaces 25, 27, respectively, of the heat shield 18.

In certain embodiments, the total thickness (i.e., from the exposed surface 25 to the opposite surface 27, as measured from the peaks 31 if a point bonded sheet(s) is present) of the heat shield 18 can be about 0.1 mm to about 1 mm. However, in one particular embodiment, the total thickness of the heat shield 18 can be about 0.2 mm to about 0.6 mm.

Each of the components of the heat shield 18 is discussed in greater detail below.

A. Base Substrate

As stated, the base substrate 22 can be a nonwoven web, a woven web, a film, a metal foil, or other suitable substrate that is sufficiently flexible to serve as a component of the air bag. Suitable nonwoven webs can include paper making fibers (e.g., a paper web including cellulose fibers), polymeric fibers (e.g., a spunbonded or meltblown web of polyolefin fibers), and the like.

In one particular embodiment, the base substrate 22 can be a metal foil and/or a plastic film having a thin metal coating (e.g., an aluminum coating). For example, the base substrate 22 can be a polyester film (e.g., as polyethylene terephthalate (PET), such as a biaxially-oriented polyethylene terephthalate) having a thin aluminum coating vapor deposited thereon. Without wishing to be bound by any particular theory, it is presently believed that the presence of a metal layer (e.g., as a foil or a thin film) can serve to help dissipate heat energy across the base substrate 22 when exposed to a focused energy source. The heat resistant coating can be applied directly onto, in one embodiment, the thin metal film.

The base substrate 22 can be point-bonded, if desired.

B. Heat Resistant Coating

The heat resistant coating 20 generally includes particles 21 of an inorganic mineral dispersed within a film-forming binder 19. The inorganic mineral particles 21 generally serve, collectively, to deflect and/or absorb heat energy applied to the coating so that the underlying fabric(s) are substantially protected. Thus, the inorganic material has a higher heat capacity than the heat generated by the air bag inflator. For example, the inorganic mineral material forming the particles 21 can include, but is not limited to, vermiculite, mica, clay materials, calcium carbonate and the like, or a mixture thereof.

In one particular embodiment, vermiculite can be included (either alone or in combination with another inorganic mineral material) in the heat resistant coating 20. Vermiculite is, as is generally known in the art, a hydrated laminar magnesium-aluminum-iron silicate, which resembles mica in appearance, as both contain silicate sheets. Due to its crystal structure, vermiculite expands with the application of heat. The expansion, known as exfoliation, is the result of the mechanical separation of the layers within vermiculite by the rapid conversion of contained water to steam. Without wishing to be bound by any particular theory, it is believed that this expansion mechanism serves to absorb a large portion of the heat applied to the coating, resulting in the underlying fabric being sufficiently protected from the heat. Thus, the resulting coating fabric is particularly suitable for enduring the quick exposure to heat upon firing of the pyrotechnic device to protect the underlying fabric.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 21 may, generally, have a plate-like shape in that each particle's thickness is less than the width and/or length. This particular shape of the particles 21 can be formed via granulation and/or exfoliation as discussed above. For instance, each particle 21 can have a thickness that is less than about 10 times the largest dimension of the particle. For example, the particles 21 can have an aspect ratio (width:thickness) of between about 500:1 to about 1000:1.

For example, the particles 21 may have an average thickness of less than about 50 nm, such as about 0.1 nm to about 50 nm when exfoliated. Alternatively, the particles 21 may have a largest dimension of about 0.5 µm to about 50 µm. For instance, the particles 21 may have a diameter or greatest dimension in the range of from about 10 µm to about 40 µm. As such, in certain embodiments, the particles 21 may have an average thickness of about 0.5 nm to about 10 nm, and may have a largest dimension of about 10 µm to about 40 µm (e.g., width and/or length). In one particular embodiment, the particles 21 can have an average size of about 1 nm to about 2 nm in its thickness while having an average diameter of about 20 µm to about 40 µm.

Such a relatively small particle size can allow for a relatively large surface area of the mineral material for absorbing and/or dispersing heat applied thereto. Additionally, the use of such relatively small particles allows the coating to remain flexible.

The film-forming binder 19 generally serves as to adhere and hold the particles 21 in place within the heat resistant coating 20 on the base substrate 22. Thermal set or thermoplastic binders can be utilized to facilitate the coating process. Such binder materials include, but are not limited to, acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 20. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating up to about 20%, such as from about 0.5% to about 5%. Exemplary surfactants can include nonionic surfactants and/or ionic surfactants.

A plasticizer may be also included in the heat resistant coating. A plasticizer is an additive that generally increases the flexibility of the final coating by lowering the glass transition temperature for the binder (and thus making it softer). In one embodiment, the plasticizer can be present in the heat resistant coating up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight poly(ethylene oxide). The viscosity modifier can be included in any amount to help the coating process, such as up to about 5% by weight, such as about 0.5% to about 3% by weight.

To form the heat shield 18, the particles 21 of inorganic material can be combined with the film-forming binder 19 to form a coating/paste, which can then be wet-laid onto a surface 23 of the base substrate 22 and dried to form the coating 20. For example, the particles 21 can be combined as dry particles or dispersed within a solvent system, as discussed above. After drying, the inorganic material of the particles 21 can constitute about 0.5% by weight to about 99.5% by weight of the total weight of the heat resistant coating 20 (e.g., about 50% by weight to about 95% by weight).

Depending on the level of heat shielding desired for a particular application, the thickness of the heat resistant coating 20 can be varied along with the type of inorganic material included in the particle 21 and/or the concentration of particles 21 in the coating 20. In most embodiments, the thickness of the heat resistant coating 20 can be about 10 µm to about 1 mm (e.g., about 10 µm to about 100 µm).

In one embodiment, a single application of the heat resistant coating 20 is sufficient to protect the airbag during inflation. However, multiple applications are available and can be applied using the method as described above. Thus, the presently described heat shield 18 is not limited to a single layer of the heat resistant coating 20.

C. First Point-Bonded Sheet

The heat shield 18 also optionally includes a point-bonded sheet 24 on the heat resistant coating 20 to form an exposed surface 25 of the heat shield 18, as shown in FIG. 2. The point-bonded sheet 24 serves reduce the coefficient of friction of the exposed surface 25 by providing a texture to the heat shield 18. This advantage serves to protect the underlying heat resistant coating 20 during manufacture and installation of the airbag and/or its components during the manufacturing process. For example, referring to FIGS. 1 and 3, the point-bonded sheet 24 can protect the heat resistant coating 20 when the pyrotechnic device 16 is inserted into the airbag 10.

Point-bonding generally creates unbonded regions 30 and bonded regions 32 in the point-bonded sheet 24. Generally, the unbonded regions 30 define peaks 31 in the point-bonded sheet 24. Conversely, the bonded regions 30 generally define valleys 33 in the point-bonded sheet 24. Simply stated, the bonded regions 32 can have a thickness that is less than that of the unbonded regions 30. For example, the point-bonded sheet 24 in the bonded regions 32 can an average thickness that is about 25% to about 75% of the average thickness of the unbonded regions 30.

These alternating peaks 31 and valleys 33 serve to form a texturized surface on the heat shield 18, which leads to a relatively low-friction heat shield that does not substantially interfere with the inflation mechanism of the airbag. In one embodiment, the bonded regions 32 define about 15% to about 75% of the total surface area of the heat resistant coating 20.

The point-bonded sheet 24 can be a nonwoven web, a woven web, or a film formed from suitable thermoset and or thermoplastic material that has been point-bonded. In one particular embodiment, the point-bonded sheet 24 can be a nonwoven web (e.g., spunbonded, melt-blown, airlaid, etc.) of thermoplastic and/or thermoset polymeric fibers. Particularly suitable thermoplastic and/or thermoset polymers for use in the point-bonded sheet 24 include polyesters (e.g., polyethylene terephthalate), polyolefins (e.g., polyethylene, polypropylene, polybutylene, etc.), polyurethanes, etc., and copolymers thereof. Upon lamination, the polymeric material can serve to adhere the point-bonded sheet 24 to the heat shield 18.

D. Second Point-Bonded Sheet

The heat shield 18 also optionally includes a second point-bonded sheet 26 on the base substrate 22 to form an opposite surface 27 of the heat shield 18, as shown in FIG. 2. This second point-bonded sheet 26 can be similar to that discussed above, with respect to the first point-bonded sheet 24. In one particular embodiment, the second point-bonded sheet 26 can be identical to the first point-bonded sheet 24.

II. Heat Shield Within an Airbag

Referring to FIG. 1, a vehicle safety device 10 is generally shown utilizing the heat shield as a heat shield 18 positioned within the interior 15 of the airbag 12 and proximate to the aperture 14 such that the heat resistant coating 20 faces the interior space 15 of the airbag 12. A pyrotechnic device 16 is positioned within working proximity to the aperture 14, and is configured to fill the interior space 15 of the airbag 12 with a gas 17 upon ignition. FIG. 3 shows a closer view of the aperture 14 and the pyrotechnic device 16. When a vehicle crashes, the pyrotechnic device 16 ignites sending hot gas 17 through the aperture 14 to the inner space 13 of the airbag 12. The hot gas 17 forces the airbag 12 to expand and to create a cushion for the vehicle occupant.

Thus, the heat shield 18 can be utilized as a heat shield positioned within the interior space 15 of an airbag 12 that is located in the area at least in working proximity to the aperture 14, where the hot air will enter the airbag 12 and make initial first contact. The location can be selected to include those areas where the hot gas comes in contact with the heat shield 18 before coming in contact with the inner surface 13 of the airbag 12. Referring to FIG. 3, for example, the hot gas flows through the aperture 14 and comes in contact with the heat shield 18. The gas 17 then enters the inner space 15 of the airbag 12. Due to the composition of the coating 20, the heat shield 18 is able to withstand the temperature of the gas/particulates 17 exiting the pyrotechnic device 16, allowing the gas 17 to travel into the inner space 15 of the airbag 12 causing inflation of the airbag 12 to act as a cushion for the vehicle occupant.

Due to the presence and positioning of the heat shield 18, as described with reference to FIG. 2, any applied heat energy first contacts the heat resistant coating 20 directly, which serves to protect the base substrate 22 and/or the fabric of the airbag 12.

The heat shield 18 can be any suitable size sufficient to delay contact between the hot gas and the inner surface of the airbag. The size and shape of the airbag 10 and, accordingly, the size and shape of the heat shield 18 will vary depending on where the airbag 10 is to be located (i.e., the front or side of the vehicle, in the drivers or passenger's seat).

The airbag material 12 can be any suitable material known in the airbag manufacturing arts, including but not limited to, a nylon fabric.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A vehicle safety device, comprising:
   an airbag comprising a base fabric and forming an interior space, wherein the airbag defines an aperture;
   a pyrotechnic device positioned within working proximity to the aperture defined in the airbag, wherein the pyrotechnic device is configured to fill the interior space of the airbag with a gas upon ignition; and a heat shield positioned within the interior of the airbag and proximate to the aperture, wherein the heat shield comprises:

a base substrate;

a heat resistant coating on the base substrate, wherein the heat resistant coating comprises particles of an organic material dispersed within a film-forming binder, wherein the organic material comprises vermiculite, mica, or a combination thereof; and a first point-bonded sheet laminated to the heat resistant coating such that the first point-bonded sheet forms an outer surface of the heat shield with the heat resistant coating positioned between the first point-bonded sheet and the base substrate, and wherein the heat shield is positioned such that the first point-bonded sheet faces the interior space of the airbag.

2. The vehicle safety device as in claim 1, wherein the heat shield further comprises:

a second point-bonded sheet laminated to the base substrate such that the second point-bonded sheet is positioned opposite to the first point-bonded sheet.

3. The vehicle safety device as in claim 1, wherein the base substrate is a nonwoven fabric, a woven fabric, or a film.

4. The vehicle safety device as in claim 1, wherein the film-forming binder comprises an acrylic resin, a styrene-butadiene rubber, a polyvinyl alcohol, an ethyl vinyl acetate resin, a phenolic resin, or a combination thereof.

5. The vehicle safety device as in claim 1, wherein the particles have an average thickness of less than about 50 nm, and wherein the particles have a largest dimension of about 0.5 μm to about 50 μm.

6. The vehicle safety device as in claim 1, wherein the particles have an aspect ratio of between about 500:1 to about 1000:1.

7. The vehicle safety device as in claim 1, wherein the heat resistant coating further comprises a surfactant, a plasticizer, or a combination thereof.

8. The vehicle safety device as in claim 1, wherein the inorganic material comprises about 50% by weight to about 95% by weight of the heat resistant coating upon drying.

9. The vehicle safety device as in claim 1, wherein the heat resistant coating has an average thickness of about 10 μm to about 100 μm.

10. The vehicle safety device as in claim 1, wherein the first point-bonded sheet comprises a point-bonded nonwoven web of thermoplastic and/or thermoset polymers.

11. The vehicle safety device as in claim 1, wherein the heat shield defines a laminate having a total thickness of about 0.1 mm to about 1 mm.

12. The vehicle safety device as in claim 1, wherein the base substrate comprises a plastic film having a thin metal coating.

13. The vehicle safety device as in claim 1, wherein the thin metal coating comprises aluminum.

14. The vehicle safety device as in claim 1, wherein the plastic film comprises a polyester.

15. The vehicle safety device as in claim 1, wherein the heat resistant coating is directly adjacent to the thin metal film.

16. The vehicle safety device as in claim 1, wherein the base substrate is point-bonded.

17. The vehicle safety device as in claim 1, wherein the heat shield surrounds the aperture.

* * * * *